United States Patent
Ferentz et al.

(10) Patent No.: US 7,593,756 B2
(45) Date of Patent: Sep. 22, 2009

(54) DETECTION FOR HIGH POWERED DEVICES

(75) Inventors: Alon Ferentz, Bat Yam (IL); Roni Blaut, Netanya (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 621 days.

(21) Appl. No.: 11/277,539

(22) Filed: Mar. 27, 2006

(65) Prior Publication Data

US 2006/0171399 A1 Aug. 3, 2006

Related U.S. Application Data

(63) Continuation-in-part of application No. 11/053,872, filed on Feb. 10, 2005, and a continuation-in-part of application No. 11/036,063, filed on Jan. 18, 2005, now Pat. No. 7,299,368, which is a continuation-in-part of application No. 10/761,327, filed on Jan. 22, 2004.

(60) Provisional application No. 60/512,362, filed on Oct. 16, 2003, provisional application No. 60/608,874, filed on Sep. 13, 2004.

(51) Int. Cl.
*H04B 1/38* (2006.01)
*H04M 1/00* (2006.01)
*H02J 1/10* (2006.01)
*G06F 1/00* (2006.01)

(52) U.S. Cl. ............. 455/572; 455/343.1; 455/127.1; 455/423; 455/67.11; 307/43; 307/17; 307/18; 307/12; 713/300; 713/320; 713/340

(58) Field of Classification Search ........... 455/572, 455/403, 426.1, 426.2, 127.1, 343.6, 343.1, 455/402

See application file for complete search history.

(56) References Cited

U.S. PATENT DOCUMENTS

| | | | |
|---|---|---|---|
| 5,404,090 A * | 4/1995 | Shinbori | 307/66 |
| 5,991,885 A | 11/1999 | Chang et al. | |
| 6,218,930 B1 | 4/2001 | Katzenberg et al. | |
| 6,385,024 B1 * | 5/2002 | Olson | 361/87 |
| 6,473,608 B1 | 10/2002 | Lehr et al. | |
| 6,535,983 B1 * | 3/2003 | McCormack et al. | 713/310 |
| 6,643,566 B1 | 11/2003 | Lehr et al. | |
| 6,968,218 B2 * | 11/2005 | Petty | 455/572 |
| 6,985,713 B2 | 1/2006 | Lehr et al. | |
| 7,299,368 B2 * | 11/2007 | Peker et al. | 713/300 |
| 7,373,528 B2 * | 5/2008 | Schindler | 713/300 |
| 7,460,889 B2 * | 12/2008 | Darshan et al. | 455/572 |
| 2005/0085212 A1 | 4/2005 | Peker et al. | |
| 2005/0197094 A1 | 9/2005 | Darshan et al. | |
| 2005/0227640 A1 * | 10/2005 | Haque et al. | 455/126 |
| 2006/0063509 A1 * | 3/2006 | Pincu et al. | 455/402 |
| 2006/0092000 A1 | 5/2006 | Karam et al. | |
| 2007/0064819 A1 * | 3/2007 | Langer | 375/257 |

* cited by examiner

*Primary Examiner*—Huy Q Phan
(74) *Attorney, Agent, or Firm*—Simon Kahn (57) ABSTRACT

A powering source unit comprising: a first powering source; a second powering source; the first powering source being operable to: apply a plurality of voltages towards a powered device via a first path so as to detect a signature impedance, and in the event the signature impedance is detected, to at least partially classify the power requirements of the powered device by supplying a classification voltage towards the powered device via the first path and measuring the resultant current flow, the classification voltage level being higher than each of the plurality of detection voltage levels; the second powering source being operable to apply at least one voltage towards the powered device via a second path so as to attempt to detect a signature impedance at least partially contemporaneously with the supplied classification voltage of the first powering source.

25 Claims, 8 Drawing Sheets

DETECTION FOR HIGH POWERED DEVICES

CROSS REFERENCE TO RELATED APPLICATIONS

This application is a continuation-in-part of U.S. patent application Ser. No. 11/053,872 filed Feb. 10, 2005 entitled "High Power Classification for Power Over Ethernet", and a continuation-in-part of U.S. patent application Ser. No. 11/036,063 filed Jan. 18, 2005 now U.S. Pat. No. 7,299,368 entitled "High Power Architecture for Power Over Ethernet" both of which are continuations-in-part of U.S. patent application Ser. No. 10/761,327 filed Jan. 22, 2004 entitled "High Power Architecture for Power Over Ethernet", which claims priority from U.S. Provisional Patent Application Ser. No. 60/512,362 filed Oct. 16, 2003 entitled "POWERED DEVICE ASIC". Application Ser. No. 11/053,872 filed Feb. 10, 2005 claims priority from U.S. Provisional Patent Application Ser. No. 60/608,874 filed Sep. 13, 2004 entitled "Redundant Powered Device Circuit". The contents of all of the above applications are incorporated herein by reference.

BACKGROUND OF THE INVENTION

The invention relates generally to the field of power over local area networks, particularly Ethernet based networks, and more particularly to a method of detection and determination of a type of powered device attached over four twisted wire pairs.

The growth of local and wide area networks based on Ethernet technology has been an important driver for cabling offices and homes with structured cabling systems having multiple twisted wire pairs. The structure cable is also known herein as communication cabling and typically comprises four twisted wire pairs. In certain networks only two twisted wire pairs are used for communication, with the other set of two twisted wire pairs being known as spare pairs. In other networks all four twisted wire pairs are used for communication. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

The IEEE 802.3af-2003 standard, whose contents are incorporated herein by reference, is addressed to powering remote devices over an Ethernet based network. The above standard is limited to a powered device (PD) having a maximum power requirement during operation of 12.95 watts. Power can be delivered to the PD either directly from the switch/hub known as an endpoint power sourcing equipment (PSE) or alternatively via a midspan PSE. In either case power is delivered over a set of two twisted pairs. Unfortunately, no provision has been made in the above standard for PDs requiring power in excess of the above maximum power requirement. The above mentioned standard further prescribes a method of classification having a total of 5 power levels of which classes 0, 3 and 4 result in a maximum power level of 15.4 at the PSE which is equivalent to the aforementioned 12.95 watt limit.

The IEEE 802.3 at Task Force has been established to promote a standard for delivering power in excess of that described in the aforementioned standard. Two basic approaches for increasing power exist:

1) increasing the amount of power delivered over a single set of two twisted wire pairs as compared to the power limits of the above IEEE 802.3 af standard; and
2) delivering power over two sets of two twisted wire pairs.

For simplicity, a powered devices arranged to receive power in accordance with the IEEE 802.3 af standard, i.e. at power levels on the order of a maximum of 12.95 watts with power being delivered over a single set of two twisted wire pairs is hereinafter denoted an 'af device or an 'af PD. A PD arranged to receive power in excess of 12.95 watts, or is operational in accordance with a standard which allows for power significantly in excess of 12.95 watts is called hereinafter a high power PD.

Delivering power over all four twisted wire pairs, i.e. over two sets of two twisted wire pairs of the communication cabling requires careful attention to a number of possible connection combinations. In particular, the PSE is not a-priori aware of the actual device connected, and therefore detection and classification must detect and determine a possible non-powered device, an 'af PD which is connected with a diode bridge input allowing for powering over either set of two twisted wire pairs, a high power PD receiving power over both sets of twisted wire pairs, and a high power PD receiving high power over either set of two twisted wire pairs. In an exemplary embodiment a high power PD arranged to receive power over a single set of two twisted wire pairs is powered at a higher voltage than an 'af PD.

In an exemplary embodiment a high power PD receiving power over all four twisted wire pairs is provided with a combiner as described in pending U.S. patent application Ser. No. 10/761,327 filed Jan. 22, 2004 entitled "High Power Architecture for Power Over Ethernet" whose entire contents are incorporated herein by reference. Such a combiner exhibits a detectable signature impedance at the input for each set of two twisted wire pair connections receiving power.

Several patents addressed to the issue of supplying power to a PD over an Ethernet based network exist including: U.S. Pat. No. 6,473,608 issued to Lehr et al. and U.S. Pat. No. 6,643,566 issued to Lehr et al. the contents of both of which are incorporated herein by reference.

A PSE is a power sourcing equipment arranged to power a specific PD over a specific link. Thus, in an 'af environment a single PSE is associated with a single PD. In a high power environment, a number of options exist, including powering a single PD from a plurality of PSEs. For the sake of clarity, for the purposes of this document the term Powering Source (PS) is used to mean a single powering source designed for connection to a single set of twisted wire pairs. Thus, a high power PD may be arranged to receive power from a single PS over a single set of two twisted wire pairs, or from two PSs over two sets of twisted wire pairs. Functionality, such as detection and classification may be separately supplied to each PS, or may be shared among the PSs by a single controller.

It would therefore be desirable to have an architecture enabling powering remote devices over an Ethernet network having high power needs, and preferably having a method operable to detect and identify a possible 'af PD which is connected with a diode bridge input allowing for powering over either two twisted wire pairs, a high power PD received power over both twisted wire pairs, and a high power PD receiving high power over either two twisted wire pairs.

SUMMARY OF THE INVENTION

Accordingly, it is a principal object of the present invention to overcome the disadvantages of prior art in powering remote devices. This is provided in the present invention by a method of detection in which a first of two PSs associated with a single PD initiates a detection phase, and in the event a valid PD is detected during the detection phase the first PS begins a classification phase. The classification phase comprises the PS outputting a voltage towards the PD greater than any voltages of the detection phase. A second of two PSs associated with the same PD initiates and performs a detection phase at least partially contemporaneously with the classification phase of the first PS. Thus, in the event an 'af PD or a high power PD arranged to receive power over only one set of two twisted wire pairs is connected to the two PSs, the detection phase of the second PS will return an invalid PD as a result of the contemporaneous classification voltage of the first PS.

In the event a high powered PD arranged to receive power over two sets of two twisted wire pairs is connected to the two PSs, both PSs will detect a valid PD during the detection phase. Classification of the PDs is accomplished in one of a variety of methods, including methods described in pending U.S. patent application Ser. No. 11/053,872 filed Feb. 10, 2005 entitled "High Power Classification for Power Over Ethernet" the entire contents of which is incorporated herein by reference. Irrespective of the method used for classification, if available, power is then supplied over two sets of twisted wire pairs.

The invention provides for a local area network adapted to supply power to a plurality of types of powered devices over communication cabling, the local area network comprising: a powered device comprising at least one signature impedance; a first powering source; a second powering source; and communication cabling comprising a plurality of twisted wire pairs arranged to connect the first and second powering source to the powered device, the communication cabling providing a first power path comprising a first set of twisted wire pairs of the communication cabling between the first powering source and the powered device and a second power path comprising a second set of twisted wire pairs of the communication cabling between the second powering source and the powered device, the first set being different from the second set, the first powering source being operable to: apply a plurality of voltages to the powered device via the first path so as to attempt to detect a first one of the at least one signature impedance, and in the event the first one of the at least one signature impedance is detected, to at least partially classify the power requirements of the powered device by supplying a classification voltage to the powered device via the first path and measuring the resultant current flow, the classification voltage level being higher than each of the plurality of detection voltage levels; the second powering source being operable to apply at least one voltage to the powered device via the second path so as to attempt to detect a second one of the at least one signature impedance at least partially contemporaneously with the supplied classification voltage of the first powering source.

In one embodiment the local area network further comprises a power sourcing controller, the first and second powering source being responsive to the power sourcing controller. In another embodiment the powered device comprises one of: a first type of powered device arranged to accept power over either one of the first power path and the second power path, the first type of powered device exhibiting a single signature impedance to the first and second paths; and a second type of powered device arranged to accept power over both the first power path and the second power path, the second type of powered device adapted to exhibit the signature impedance to the second path while receiving the classification voltage on the first path.

In one embodiment in the event the powered device is of the first type, the second powering source will not detect the single signature impedance. In another embodiment in the event the first powering source detects the first one of the at least one signature impedance and the second powering source detects the second one of the at least one signature impedance, the first and second powering sources are further operable to power the powered device via both the respective first and second paths.

In one embodiment the local area network further comprises a power sourcing controller in communication with the first powering source and the second powering source, and wherein in the event the first powering source detects the first one of the at least one signature impedance and the second powering source detects the second one of the at least one signature impedance, the first and second powering sources are further operable by the power sourcing controller to power the powered device via both the respective first and second paths. In one embodiment in the event the first powering source detects the first one of the at least one signature impedance and the second powering source detects the second one of the at least one signature impedance, the second powering source is further operable to at least partially classify the power requirements of the powered device by supplying a supplying a classification voltage to the powered device via the second path and measuring the resultant current flow. In one further embodiment the first and second powering sources are operable to power the powered device via the respective first and second paths responsive to the at least partial classifications. In another further embodiment the local area network further comprises a power sourcing controller in communication with the first powering source and the second powering source, the power sourcing controller being operable to classify the the power requirements of the powered device responsive to the measured resultant current flow of the classification voltage of the first powering source and the measured resultant current flow of the classification voltage of the second powering source.

In one embodiment in the event the first powering source does not detect the first one of the at least one signature impedance, the second powering source is operable to apply a plurality of voltages to the powered device via the second path so as to attempt to detect the at least one signature impedance. In one further embodiment in the event the second powering source detects the at least one signature impedance, the second powering source is further operable to power the powered device via the second path. In another further embodiment the local area network further comprises a power sourcing controller in communication with each of the first powering source and the second powering source, and wherein in the event the second powering source detects the at least one signature impedance, the second powering source is further operable responsive to the power sourcing controller to: at least partially classify the power requirements of the powered device by supplying a classification voltage to the powered device via the second path and measuring the resultant current flow; and power the powered device via the second path responsive to the at least partial classification. In another further embodiment in the event the second powering source detects the at least one signature impedance, the second powering source is further operable to: at least partially classify the power requirements of the powered device by supplying a classification voltage to the powered device via the second path and measuring the resultant current flow; and power the powered device via the second path responsive to the at least partial classification.

In one embodiment in the event the first powering source detects the first one of the at least one signature impedance and the second powering source does not detect the second one of the at least one signature impedance, the first powering source is operable to power the powered device via the first power path responsive to the at least partial classification.

The invention further provides for a method of detecting, classifying and powering a powered device, the method comprising: providing a first powering source; providing a second powering source; attempting to detect via applying a plurality of voltages from the provided first powering source a first signature impedance of a connected powered device; in the event the signature impedance is detected by the provided first powering source, at least partially classifying the power requirements of the powered device by providing a classification voltage from the provided first powering source to the connected powered device, the classification voltage being greater than any of the applied plurality of voltages of the detecting; and attempting to detect via applying at least one voltage from the provided second powering source a second signature impedance of a connected powered device at least partially contemporaneously with the at least partially classifying of the provided first powering source, the provided classification voltage preventing the detection of the second signature impedance in the event the first powering source and the second powering source are connected to a powered device arranged to accept power from either one, but not both, of the first and second powering source.

In one embodiment the method further comprises in the event the first powering source detects the first signature impedance and the second powering source detects the second signature impedance at least partially contemporaneously with the at least partially classifying of the provided first power source: powering the powered device via both the provided first and second powering source. In another embodiment the method further comprises in the event the first powering source detects the first signature impedance and the second powering source detects the second signature impedance: at least partially classifying the power requirements of the powered device equipment by providing a classification voltage from the provided second powering source; and powering the powered device via both the provided first and second powering source responsive to the at least partial classifications.

In one embodiment the method further comprises in the event the provided first powering source does not detect a signature impedance: attempting to detect via applying a plurality of voltages from the provided second powering source a signature impedance of the connected powered device. In one further embedment the method further comprises in the event the provided second powering source detects the signature impedance: powering the powered device via the provided second powering source. In another further embodiment the method further comprises in the event the provided second powering source detects the signature impedance: at least partially classifying, by providing a classification voltage from the provided second powering source, the power requirements of the powered device; and powering the powered device from the provided second powering source responsive to the at least partial classification.

In one embodiment the method further comprises in the event the provided first powering source detects the first signature impedance and the provided second powering source does not detect the second signature impedance: powering the powered device from the provided first powering source responsive to the at least partial classification. In another embodiment the provided classification voltage not preventing the detection of the second signature impedance in the event the first powering source and the second powering source are connected to a powered device arranged to accept power from both of the first and second powering sources.

The invention further provides for a powering source unit adapted to supply power to a plurality of types of powered devices over communication cabling, the powering source unit comprising: a first powering source; and a second powering source; the first powering source being operable to: apply a plurality of voltages towards a powered device via a first path so as to attempt to detect a signature impedance, and in the event the signature impedance is detected, to at least partially classify the power requirements of the powered device by supplying a classification voltage towards the powered device via the first path and measuring the resultant current flow, the classification voltage level being higher than each of the plurality of detection voltage levels; the second powering source being operable to apply at least one voltage towards the powered device via a second path so as to detect a signature impedance at least partially contemporaneously with the supplied classification voltage of the first powering source.

In one embodiment in the event the first powering source detects the signature impedance and the second powering source detects the signature impedance, the first and second powering sources are further operable to supply power towards the powered device. In another embodiment the powering source unit further comprises a power sourcing controller in communication with each of the first powering source and the second powering source, the attempting to detect and the classifying being responsive to the power sourcing controller].

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

The present embodiment enable a method of detection in which a first of two PSs associated with a single PD initiates a detection phase, and in the event a valid PD is detected during the detection phase the first PS begins a classification phase. The classification phase comprises the PS outputting a voltage towards the PD greater than any voltages of the detection phase. A second of two PSs associated with the same PD initiates and performs a detection phase at least partially contemporaneously with the classification phase of the first PS. Thus, in the event an 'af PD or a high power PD arranged to receive power over one set of two twisted wire pairs is connected to the two PSs, the detection phase of the second PS will return an invalid PD as a result of the contemporaneous classification voltage of the first PS.

In the event a high powered PD arranged to receive power over two sets of two twisted wire pairs is connected to the two PSs, both PSs will detect a valid PD during the detection phase. Classification of the PDs is accomplished in one of a variety of methods, including methods described in pending U.S. patent application Ser. No. 11/053,872 filed Feb. 10, 2005 entitled "High Power Classification for Power Over Ethernet" the entire contents of which is incorporated herein by reference. Irrespective of the method used for classification, if available, power is then supplied over two sets of twisted wire pairs.

For the purposes of this patent, high power needs are defined as power needs in excess of 12.95 watts at the PD, the 12.95 watt power limit being defined by the IEEE802.3af-2003 standard. A combined high power output is hereinafter interchangeably called a high power signal. The term power is meant to include any combination of electrical voltage and current capable of supplying power to a PD, and is interchangeably used herein with the term power signal.

A high power PD may comprise: a wireless access point; laptop computer; desk top computer; security camera having pan, tilt zoom functionality; or an entrance control. The invention is operable by hub equipment operable according to any of 10 Base-T, 100 Base-T and 1000 Base-T.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3 compliant device preferably employing a 10Base-T, 100Base-T or 1000Base-T connection.

Figure 1A:
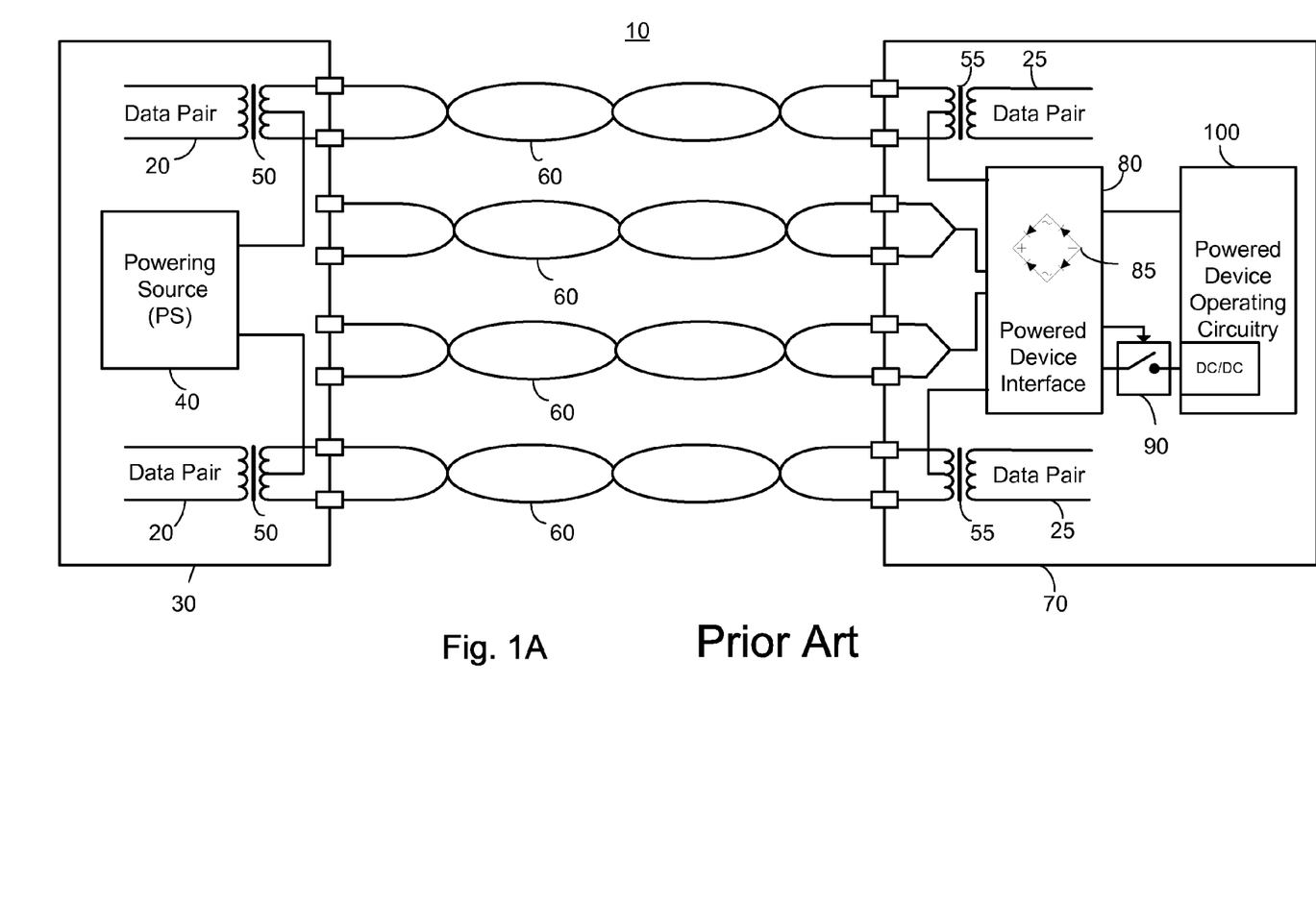
FIG. 1A illustrates a high level block diagram of a first alternative network configuration for remote powering from an endpoint PS known to the prior art.

FIG. 1A illustrates a high level block diagram of a first alternative network configuration 10 for remote powering from an endpoint PS known to the prior art. Network configuration 10 comprises: a switch/hub equipment 30 comprising a first and a second data pair 20, a PS 40 and a first and a second data transformer 50; a first, a second, a third and a fourth twisted wire pair connection 60; and a powered end station 70 comprising a PD interface 80 exhibiting a diode bridge 85, a first and a second data transformer 55, a first and a second data pair 25, an isolation switch 90, and a PD operating circuitry 100. The output and return of PS 40 are connected, respectively, to the center tap of the secondary of first and second data transformers 50. The primary of first and second data transformers 50 are each connected to communication devices, represented by first and second data pairs 20. The output leads of the secondary of first and second data transformers 50 are each connected to a first end of first and second twisted wire pair connections 60, respectively. The second end of first and second twisted wire pair connections 60, are respectively connected to the primary of first and second data transformers 55 located within powered end station 70. The center tap of the primary of first and second data transformer 55 are connected respectively to a power input and return of PD interface 80. PD interface 80 comprises diode bridge 85 arrange to ensure proper operation of powered end station 70 irrespective of the polarity of the connection to PS 40 and irrespective of whether PS 40 is connected to PD interface 80 via the combination of first and second twisted wire pair connections 60 or via the combination of third and fourth twisted wire pair connections 60. The output of PD interface 80 is connected via isolation switch 90 controlled by PD interface 80 to PD operating circuitry 100. The secondary of first and second data transformers 55 are connected to communication devices, represented by first and second data pairs 25, respectively.

In operation, PS 40 detects, optionally classifies, and if power is available, supplies power over first and second twisted wire pair connection 60 to powered end station 70, thus supplying both power and data over first and second twisted wire pair connections 60. Third and fourth twisted wire pair connections 60 are not utilized, and are thus available as spare connections. Third and fourth twisted wire pair connections 60 are shown connected to PD interface 80 in order to allow operation alternatively in a manner that will be described further hereinto below in relation to FIG. 1B over unused third and fourth twisted wire pair connections 60. PD interface 80 functions to present a signature impedance to PS 40 for the detection phase, optionally present a classification current responsive to a classification voltage, and upon detection of a sufficient operating voltage, irrespective of polarity, to close isolating switch 100 thereby powering PD operating circuitry 100.

Figure 1B:
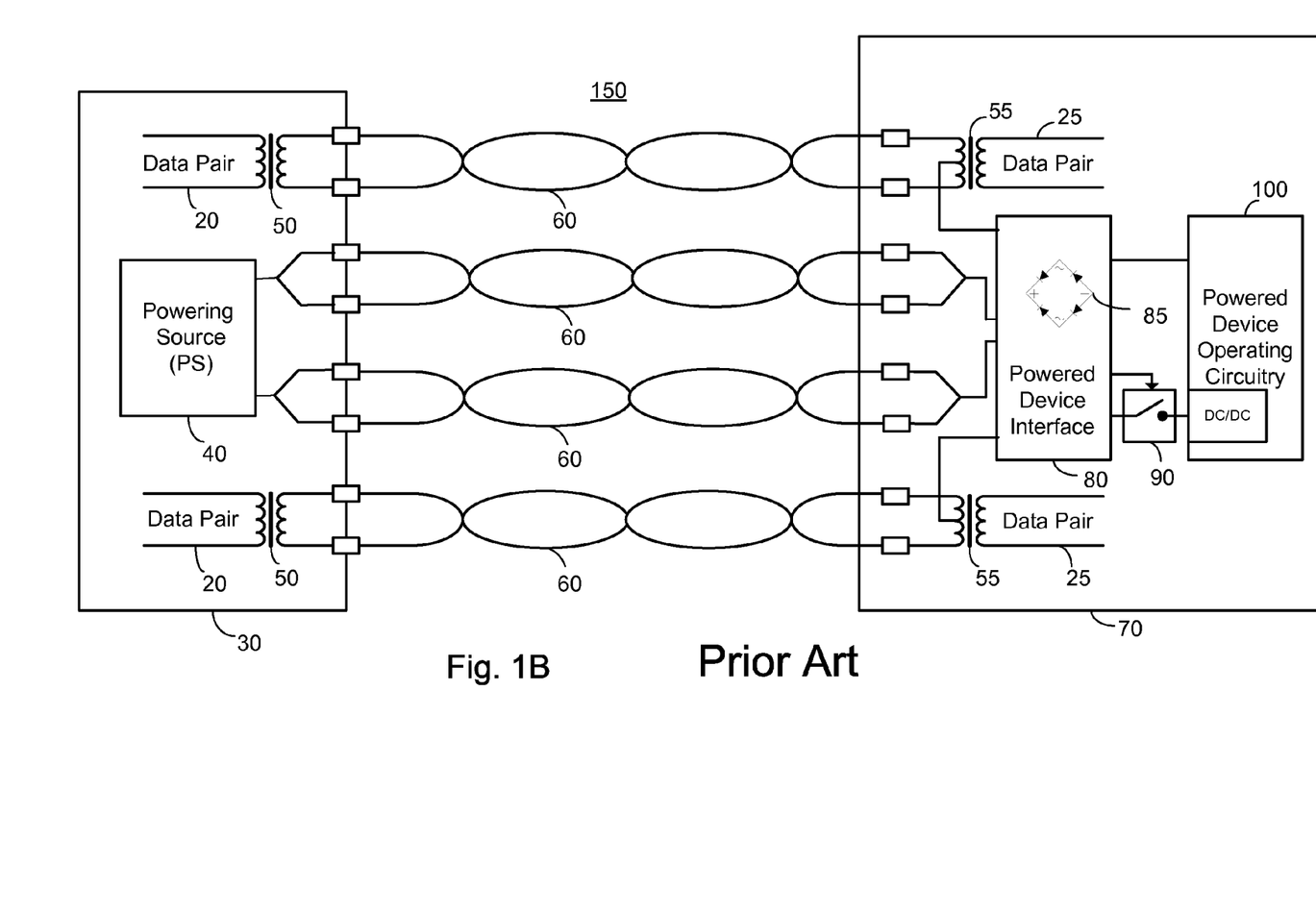
FIG. 1B illustrates a high level block diagram of a second alternative network configuration for remote powering from an endpoint PS known to the prior art.

FIG. 1B illustrates a high level block diagram of a second alternative network configuration 150 for remote powering from an endpoint PS known to the prior art. Network configuration 100 comprises: a switch/hub equipment 30 comprising a first and a second data pair 20, a PS 40 and a first and a second data transformer 50; a first, a second, a third and a fourth twisted wire pair connection 60; and a powered end station 70 comprising a PD interface 80 exhibiting a diode bridge 85, a first and a second data transformer 55, a first and a second data pair 25, an isolation switch 90, and a PD operating circuitry 100. The primary of first and second data transformers 50 are connected to communication devices, represented by first and second data pairs 20, respectively. The output leads of the secondary of first and second data transformers 50 are each connected to a first end of first and second twisted wire pair connections 60, respectively. The output and return of PS 40 are connected, respectively, to both leads of third and fourth twisted wire pair connections 60. The second end of each of first and second twisted wire pair connections 60 is connected to the primary of first and second data transformer 55, respectively, located within powered end station 70. The center tap of the primary of first and second data transformer 55 is connected to PD interface 80. The second end of third and fourth twisted wire pair connections 60 are respectively connected to a power input and return of PD interface 80. PD interface 80 comprises diode bridge 85 arrange to ensure proper operation of powered end station 70 irrespective of the polarity of the connection to PS 40 and irrespective of whether PS 40 is connected to PD interface 80 via the combination of first and second twisted wire pair connections 60 or via the combination of third and fourth twisted wire pair connections 60. The output of PD interface 80 is connected via isolation switch 90 controlled by PD interface 80 to PD operating circuitry 100. The secondary of first and second data transformers 55 are connected to communication devices, represented by first and second data pairs 25, respectively.

In operation, PS 40 detects, optionally classifies, and if power is available, supplies power over third and fourth twisted wire pair connections 60, with data being supplied over first and second twisted wire pair connections 60. Power and data are thus supplied over separate connections, and are not supplied over a single twisted wire pair connection. The center tap connection of first and second data transformer 55 is not utilized, but is shown connected in order to allow operation alternatively as described above in relation to network configuration 10 of FIG. 1A. Network configurations 10 and 150 thus allow for powering powered end station 70 by PS 40 either over the set of twisted wire pair connections 60 utilized for data communications, or over the set of twisted wire pair connections 60 not utilized for data communications. Third and fourth twisted wire pair connections 60 represent a set of twisted a wire pairs. PD interface 80 functions to present a signature impedance to PS 40 for the detection phase, optionally present a classification current to PS 40 responsive to a classification voltage, and upon detection of a sufficient operating voltage, irrespective of polarity, to close isolating switch 100 thereby powering PD operating circuitry 100.

Figure 1C:
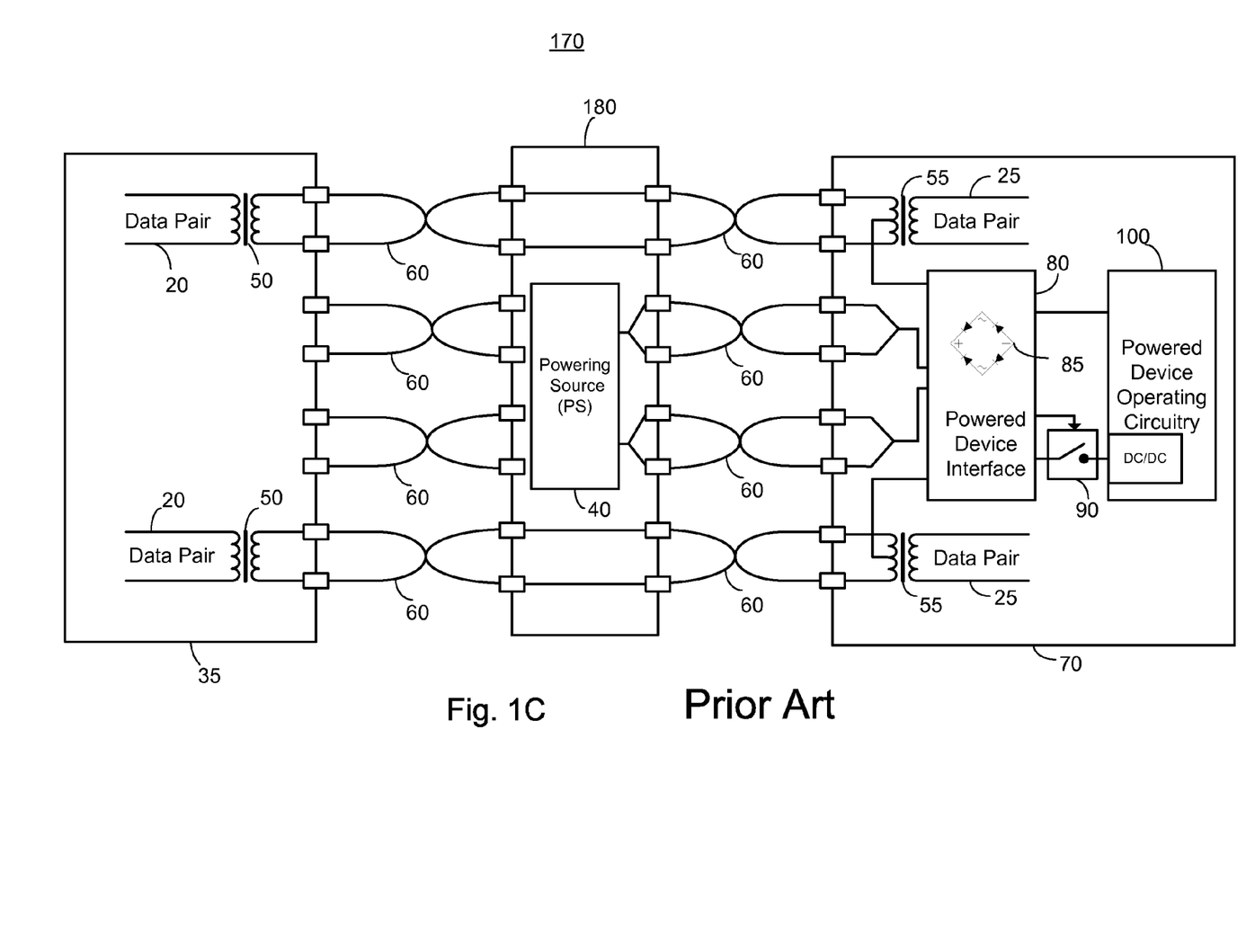
FIG. 1C illustrates a high level block diagram of an alternative network configuration for remote powering from a midspan PS known to the prior art.

FIG. 1C illustrates a high level block diagram of an alternative network configuration 170 for remote powering from a midspan power insertion equipment 180 known to the prior art. Network configuration 170 comprises: a switch/hub equipment 35 comprising a first and a second data pair 20 and a first and a second data transformer 50; a first through eighth twisted wire pair connections 60; a powered end station 70 comprising a PD interface 80 exhibiting a diode bridge 85, a first and a second data transformer 55, a first and a second data pair 25, an isolation switch 90, and a PD operating circuitry 100; and a midspan power insertion equipment 180 comprising a PS 40. The primary of first and second data transformers 50 are connected, respectively, to communication devices represented by first and second data pairs 20. The output leads of the secondary of first and second data transformers 50 are connected, respectively, to a first end of first and second twisted wire pair connections 60. The second end of first and second twisted wire pair connections 60 are connected as a straight through connection through midspan power insertion equipment 180 to a first end of fifth and sixth twisted wire pair connections 60, respectively. A second end of fifth and sixth twisted wire pair connections 60 are connected to the primary of first and second data transformer 55, respectively, located within powered end station 70. Third and fourth twisted wire pair connections 60 are shown connected between switch/hub 35 and midspan power insertion equipment 180, however no internal connection to either third of fourth twisted wire pair connection is made.

The output and return of PS 40 are respectively connected to both leads of one end of seventh and eighth twisted wire pair connections 60. The second end of both leads of seventh and eighth twisted wire pair connections 60 are respectively connected to a power input and return of PD interface 80. The center tap of the primary of each of first and second data transformer 55, located within powered end station 70, is connected to PD interface 80.

In operation, PS 40 detects, optionally classifies, and if power is available, supplies power over seventh and eighth twisted wire pair connections 60, with data being supplied from switch/hub equipment 35 over first and second twisted wire pair connections 60 through midspan power insertion equipment 180 to fifth and sixth twisted wire pair connections 60. Power and data are thus supplied over separate connections, and are not supplied over a single twisted wire pair connection. The center tap connection of each of first and second data transformer 55 is not utilized, but is shown connected in order to allow operation alternatively as described above in relation to network configuration 10 of FIG. 1A. Network configurations 10, 150 and 170 thus allow for powering powered end station 70 by PS 40 either over the set of two twisted wire pair connections 60 utilized for data communications, or over the set of two twisted wire pair connections 60 not utilized for data communications. PD interface 80 functions to present a signature impedance to PS 40 for the detection phase, optionally present a classification current responsive to a classification voltage, and upon detection of a sufficient operating voltage, irrespective of polarity, to close isolating switch 100 thereby powering PD operating circuitry 100.

Figure 2A:
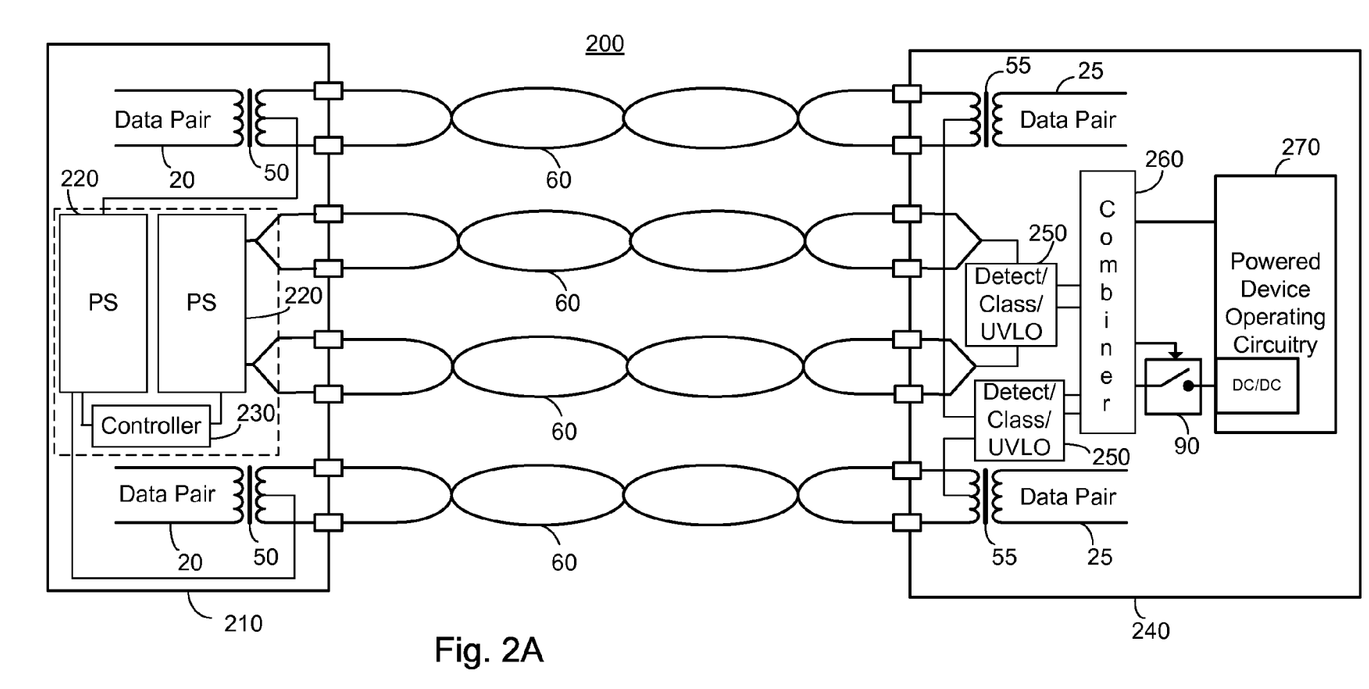
FIG. 2A illustrates a high level block diagram of a high power architecture for power over Ethernet in which two endpoint PSs are associated with a single high power PD arranged to receive power over two sets of twisted wire pairs according to the principle of the invention.

FIG. 2A illustrates a high level block diagram a high power architecture 200 for power over Ethernet in which two endpoint PSs are associated with a single high power PD arranged to receive power over each of two sets of twisted wire pairs according to the principle of the invention. High power architecture 200 comprises: a switch/hub equipment 210 comprising a first and a second data pair 20, a first and a second PS 220, a power sourcing controller 230, and a first and a second data transformer 50; a first, a second, a third and a fourth twisted wire pair connection 60; and a powered end station 240 comprising a first and a second detection/classification/under-voltage lock out (UVLO) functionality 250, a combiner 260, a first and a second data transformer 55, a first and a second data pair 25, an isolation switch 90, and a high power PD operating circuitry 270. The output and return of first PS 220 are connected, respectively, to the center tap of the secondary of first and second data transformers 50. The primary of first and second data transformers 50 are each connected to communication devices, represented by first and second data pairs 20. The output leads of the secondary of first and second data transformers 50 are each connected to a first end of first and second twisted wire pair connections 60, respectively. The output and return of second PS 220 are connected, respectively, to a first end of third and fourth twisted wire pair connections 60. Power sourcing controller 230 is connected to each of first and second PS 220. First PS 220, second PS 220 and power sourcing controller 230 form a functional power sourcing unit, and may be associated with additional PSs as part of a large power sourcing unit. The power sourcing unit may exhibit a single power sourcing controller 230 for a plurality of PS 220, and provide and/or support detection and classification functionality for each PS 220 in the power sourcing unit.

The second end of first and second twisted wire pair connections 60, are respectively connected to the primary of first and second data transformers 55. The center tap of the primary of first and second data transformer 55 are connected respectively to the power input and return of first detection/classification/UVLO functionality 250. The secondary of first and second data transformers 55 are connected to communication devices, represented by first and second data pairs 25, respectively. The second end of third and fourth twisted wire pair connections 60, are respectively connected to the power input and return of second detection/classification/UVLO functionality 250. Combiner 260 is connected to receive power from both first and second detection/classification/UVLO functionality 250, and in an exemplary embodiment is arranged to provide an output only in the event power is available from both first and second detection/classification/UVLO functionality 250. Combiner 260 is connected to control isolation switch 90, and the output of combiner 260 is connected via isolation switch 90 to high power PD operating circuitry 270.

In operation, first PS 220 and second PS 220 each detect, classify, and if power is available, supply power over first, second, third and fourth twisted wire pair connection 60 to powered end station 240. Power sourcing controller 230 controls the timing of the detection and classification phases of first and second PS 220 as will be explained further hereinto below to ensure the correct detection of powered end station 240 as a PD arranged to receive power over a first set of twisted wire pair connections constituted of first and second twisted wire pair connections 60 and a second set of twisted wire pair connections constituted of third and fourth twisted wire pair connections 60. Combiner 260 may be of a type described in one of pending U.S. patent application Ser. No. 10/761,327 filed Jan. 22, 2004 entitled "High Power Architecture for Power over Ethernet", Ser. No. 11/036,063 filed Jan. 18, 2005 entitled "High Power Architecture for Power over Ethernet" and Ser. No. 11/053,872 filed Feb. 10, 2005 entitled "High Power Classification for Power over Ethernet", the entire contents of all of which are incorporated herein by reference. Combiner 260 preferably functions to enable isolating switch 90 thereby supplying power to high power PD operating circuitry 270 only in the event that power is available from both first and second PS 220.

Figure 2B:
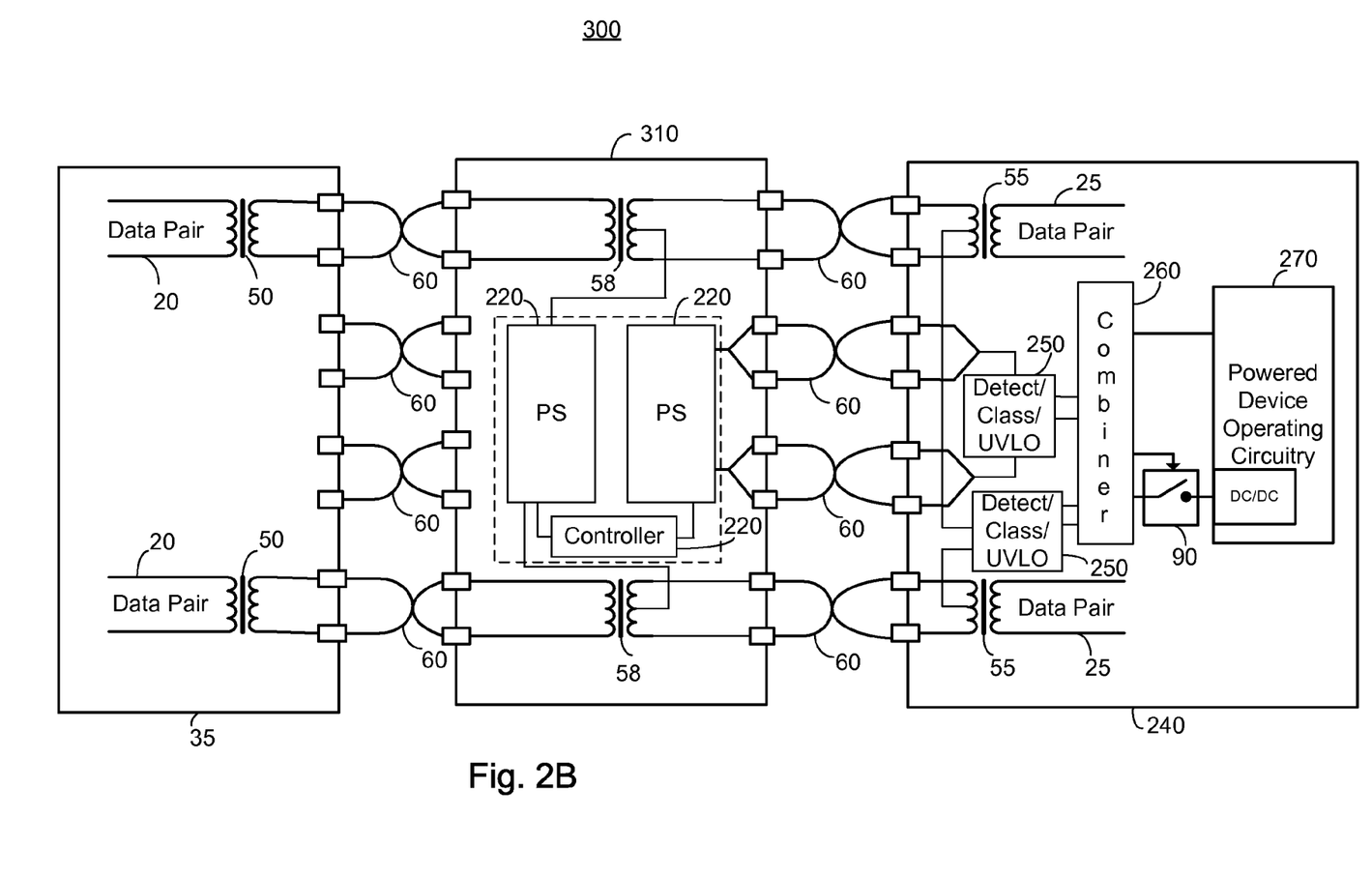
FIG. 2B illustrates a high level block diagram of a high power architecture for power over Ethernet in which two midspan PSs are associated with a single high power PD arranged to receive power over two sets of twisted wire pairs according to the principle of the invention.

FIG. 2B illustrates a high power architecture 300 for power over Ethernet in which two midspan PSs are associated with a single high power PD arranged to receive power over two sets of twisted wire pairs according to the principle of the invention. High power architecture 300 comprises: a switch/hub equipment 35 comprising a first and a second data pair 20 and a first and a second data transformer 50; a first through eighth twisted wire pair connection 60; a midspan power insertion equipment 310 comprising a first PS 220, a second PS 220, a power sourcing controller 230, a first data transformer 58 and a second data transformer 58; and a powered end station 240 comprising a first and a second detection/classification/UVLO functionality 250, a combiner 260, a first and a second data transformer 55, a first and a second data pair 25, an isolation switch 90, and a high power PD operating circuitry 270.

The primary of first and second data transformers 50 are connected, respectively, to communication devices represented by first and second data pairs 20. The output leads of the secondary of first and second data transformers 50 are connected, respectively, to a first end of first and second twisted wire pair connections 60. The second end of first and second twisted wire pair connections 60 are connected, respectively to the primary of first and second data transformers 58. The secondary of first and second data transformers 58 are respectively connected to a first end of fifth and sixth twisted wire pair connections 60. The output and return of first PS 220 are connected, respectively, to the center tap of the secondary of first and second data transformers 58. Third and fourth twisted wire pair connections 60 are shown connected between switch/hub 35 and midspan power insertion equipment 310, however no internal connection to either third of fourth twisted wire pair connections 60 is made. The output and return of second PS 220 are connected, respectively to a first end of seventh and eighth twisted wire pair connections 60. Power sourcing controller 230 is connected to each of first and second PS 220. First PS 220, second PS 220 and power sourcing controller 230 form a functional power sourcing unit, and may be associated with additional PSs as part of a large power sourcing unit. The power sourcing unit may exhibit a single power sourcing controller 230 for a plurality of PS 220, and provide and/or support detection and classification functionality for each PS 220 in the power sourcing unit.

A second end of fifth and sixth twisted wire pair connections 60 are connected to the primary of first and second data transformer 55, respectively, located within powered end station 240. The center tap of the primary of first and second data transformer 55 are connected respectively to the power input and return of first detection/classification/UVLO functionality 250. The secondary of first and second data transformers 55 are connected to communication devices, represented by first and second data pairs 25, respectively. The second end of seventh and eighth twisted wire pair connections 60, are respectively connected to the power input and return of second detection/classification/UVLO functionality 250. Combiner 260 is connected to receive power from both first and second detection/classification/UVLO functionality 250, and in an exemplary embodiment is arranged to provide an output only in the event power is available from both first and second detection/classification/UVLO functionality 250. Combiner 260 is connected to control isolation switch 90, and the output of combiner 260 is connected via isolation switch 90 to high power PD operating circuitry 270.

In operation, first PS 220 and second PS 220 each detect, classify, and if power is available, supply power over fifth, sixth, seventh and eight twisted wire pair connection 60 to powered end station 240. Power sourcing controller 230 controls the timing of the detection and classification phases of first and second PS 220 as will be explained further hereinto below to ensure the correct detection of powered end station 240 as a PD arranged to receive power over a first set of twisted wire pair connections constituted of fifth and sixth twisted wire pair connections 60 and a second set of twisted wire pair connections constituted of seventh and eight twisted wire pair connections 60. Combiner 260 may be of a type described in one of pending U.S. patent application Ser. No. 10/761,327 filed Jan. 22, 2004 entitled "High Power Architecture for Power over Ethernet", Ser. No. 11/036,063 filed Jan. 18, 2005 entitled "High Power Architecture for Power over Ethernet" and Ser. No. 11/053,872 filed Feb. 10, 2005 entitled "High Power Classification for Power over Ethernet". Combiner 260 preferably functions to enable isolating switch 90 thereby supplying power to high power PD operating circuitry 270 only in the event that power is available from both first and second PS 220.

Figure 2C:
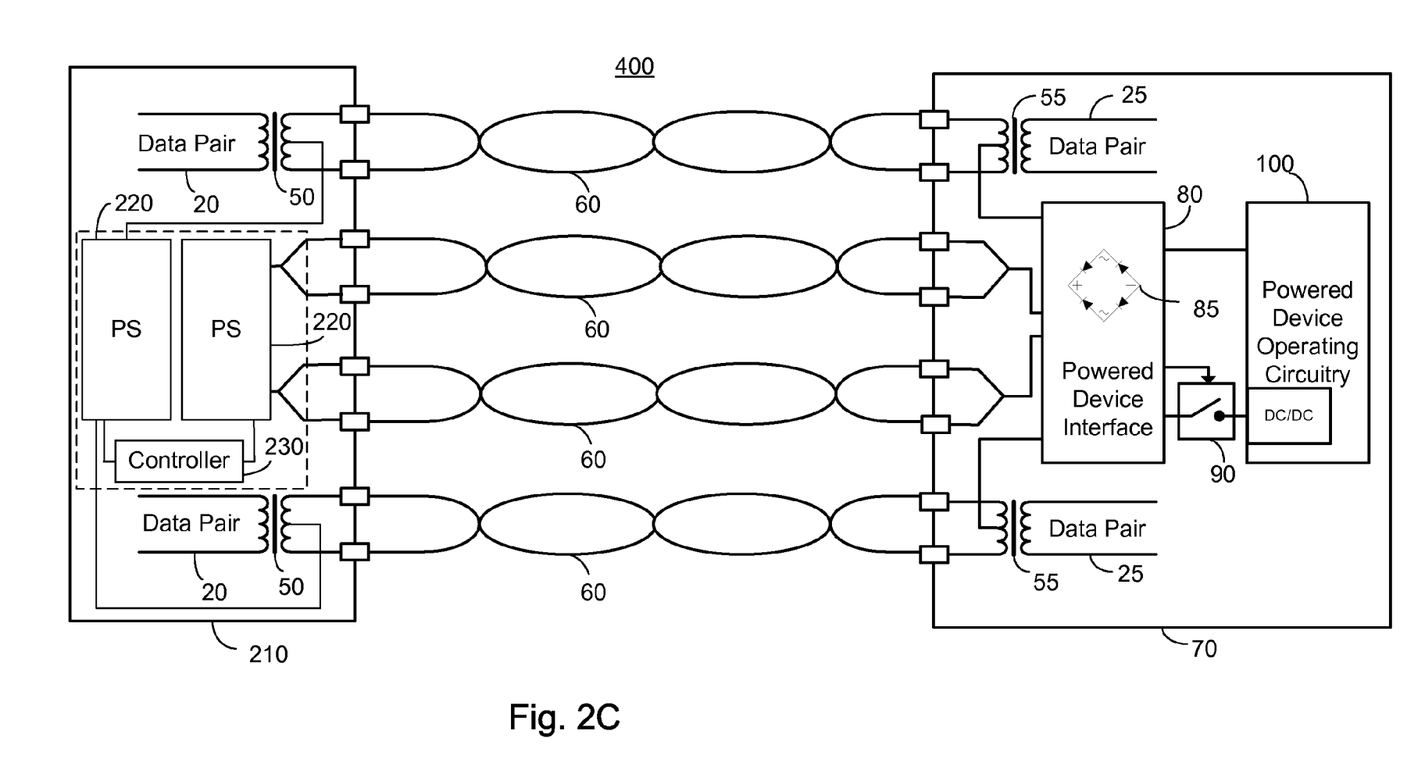
FIG. 2C illustrates a high level block diagram of an architecture in which a PD according to IEEE 802.3af is connected to a first and a second PS in accordance with the principle of the invention.

FIG. 2C illustrates a high level block diagram of an architecture 400 in which a PD according to IEEE 802.3af is connected to a first and a second PS in accordance with the principle of the invention. Architecture 400 comprises: a switch/hub equipment 210 comprising a first and a second data pair 20, a first and a second PS 220, a power sourcing controller 230, and a first and a second data transformer 50; a first, a second, a third and a fourth twisted wire pair connection 60; and a powered end station 70 comprising a PD interface 80 exhibiting a diode bridge 85, a first and a second data transformer 55, a first and a second data pair 25, an isolation switch 90, and a PD operating circuitry 100. The output and return of first PS 220 are connected, respectively, to the center tap of the secondary of first and second data transformers 50. The primary of first and second data transformers 50 are each connected to communication devices, represented by first and second data pairs 20. The output leads of the secondary of first and second data transformers 50 are each connected to a first end of first and second twisted wire pair connections 60, respectively. The output and return of second PS 220 are connected, respectively, to a first end of third and fourth twisted wire pair connections 60. Power sourcing controller 230 is connected to each of first and second PS 220. First PS 220, second PS 220 and power sourcing controller 230 form a functional power sourcing unit, and may be associated with additional PSs as part of a large power sourcing unit. The power sourcing unit may exhibit a single power sourcing controller 230 for a plurality of PS 220, and provide and/or support detection and classification functionality for each PS 220 in the power sourcing unit.

The second end of first and second twisted wire pair connections 60, are respectively connected to the primary of first and second data transformers 55. The center tap of the primary of first and second data transformer 55 are connected respectively to power input and return of PD interface 80. PD interface 80 comprises diode bridge 85 arrange to ensure proper operation of powered end station 70 irrespective of the polarity of the connection to PS 220, and irrespective of whether first PS 220 is supplying power via first and second twisted wire pair connections 60 or second PS 220 is supplying power via third and fourth twisted wire pair connections 60. The output of PD interface 80 is connected via isolation switch 90 controlled by PD interface 80 to PD operating circuitry 100. The secondary of first and second data transformers 55 are connected to communication devices, represented by first and second data pairs 25, respectively. PD interface 80 presents a signature impedance for the detection phase and a classification current, responsive to a classification voltage, associated with 'af powering to a connected PS.

In operation, first PS 220 detects PD interface 80 and then classifies PD interface 80 as is known the prior art, preferably in accordance with IEEE 802.3af-2003. Power sourcing controller 230 functions to control second PS 220 to detect PD interface 80 at least partially contemporaneously with the operation of first PS 220 to classify PD interface 80. The detection functionality associated with second PS 220 thus sees the higher voltage associated with the classification phase of first PS 220, and fails to detect the appropriate signature impedance of PD interface 80. Second PS 220, in response to the failed detection, does not output power over third and fourth twisted wire pair connections 60. In one embodiment second PS 220 attempts to detect PD interface 80 in a manner described in pending U.S. patent application Ser. No. 10/861,405 filed Jun. 7, 2004, entitled "Pre-detection of Powered Devices" the entire contents of which is incorporated herein by reference. Detection according to the above mentioned patent application advantageously fails prior to the application of a plurality of voltages. First PS 220 thus supplies power, if available, to powered end station 70, responsive to the detection and classification, over a powering path comprising first and second twisted wire pair connections 60.

Figure 2D:
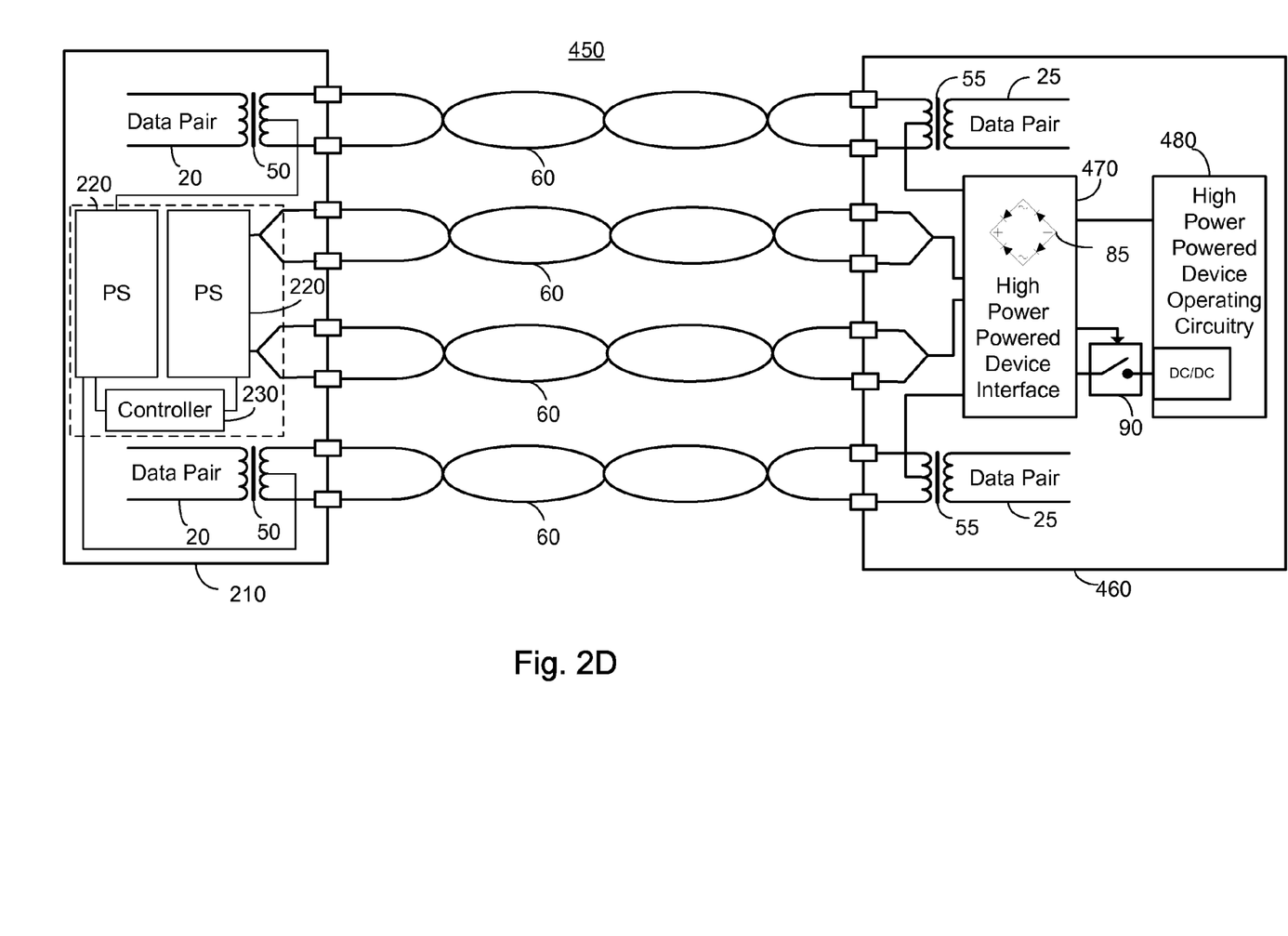
FIG. 2D illustrates a high level block diagram of an architecture in which a PD receiving high power over a single set of twisted wire pairs is connected to a first and second PS in accordance with the principle of the invention.

FIG. 2D illustrates a high level block diagram of an architecture 450 in which a PD receiving high power over a single set of twisted wire pairs is connected to a first and second PS in accordance with the principle of the invention. Architecture 450 comprises: a switch/hub equipment 210 comprising a first and a second data pair 20, a first and a second PS 220, a power sourcing controller 230, and a first and a second data transformer 50; a first, a second, a third and a fourth twisted wire pair connection 60; and a powered end station 460 comprising a high power PD interface 470 exhibiting a diode bridge 85, a first and a second data transformer 55, a first and a second data pair 25, an isolation switch 90, and a high power PD operating circuitry 480. The output and return of first PS 220 are connected, respectively, to the center tap of the secondary of first and second data transformers 50. The primary of first and second data transformers 50 are each connected to communication devices, represented by first and second data pairs 20. The output leads of the secondary of first and second data transformers 50 are each connected to a first end of first and second twisted wire pair connections 60, respectively. The output and return of second PS 220 are connected, respectively, to a first end of third and fourth twisted wire pair connections 60. Power sourcing controller 230 is connected to each of first and second PS 220. First PS 220, second PS 220 and power sourcing controller 230 form a functional power sourcing unit, and may be associated with additional PSs as part of a large power sourcing unit. The power sourcing unit may exhibit a single power sourcing controller 230 for a plurality of PS 220, and provide and/or support detection and classification functionality for each PS 220 in the power sourcing unit.

The second end of first and second twisted wire pair connections 60, are respectively connected to the primary of first and second data transformers 55. The center tap of the primary of first and second data transformer 55 are connected respectively to power input and return of high power PD interface 470. High power PD interface 470 comprises diode bridge 85 arranged to ensure proper operation of powered end station 460 irrespective of the polarity of the connection to PS 220, and irrespective of whether first PS 220 is supplying power via first and second twisted wire pair connections 60 or second PS 220 is supplying power via third and fourth twisted wire pair connections 60. The output of high power PD interface 470 is connected via isolation switch 90 controlled by high power PD interface 470 to high power PD operating circuitry 480. The secondary of first and second data transformers 55 are connected to communication devices, represented by first and second data pairs 25, respectively. High power PD interface 470 presents a signature impedance to a PS 220 and a high power classification, responsive to a classification voltage, associated with 2 pair high power to a connected PS.

In operation, first PS 220 detects high power PD interface 470 and then classifies high power PD interface 470 to recognize that it requires high power over a single set of two twisted wire pairs. The classification phase comprises the use of a voltage in excess of the voltages used in the detection phase. Power sourcing controller 230 functions to control second PS 220 to detect PD interface 80 at least partially contemporaneously with the operation of first PS 220 to classify high power PD interface 470. The detection functionality associated with second PS 220 thus sees the higher voltage associated with the classification phase of first PS 220, and fails to detect the appropriate signature impedance of high power PD interface 470. Second PS 220, in response to the failed detection, does not output power over third and fourth twisted wire pair connections 60. In one embodiment second PS 220 attempts to detect high power PD interface 470 in a manner described in pending U.S. patent application Ser. No. 10/861,405 filed Jun. 7, 2004, entitled "Pre-detection of Powered Devices". Detection according to the above mentioned patent application advantageously fails prior to the application of a plurality of voltages. First PS 220 thus supplies high power, if available, to powered end station 460, responsive to the detection and classification, over a powering path comprising first and second twisted wire pair connections 60.

Figure 3:
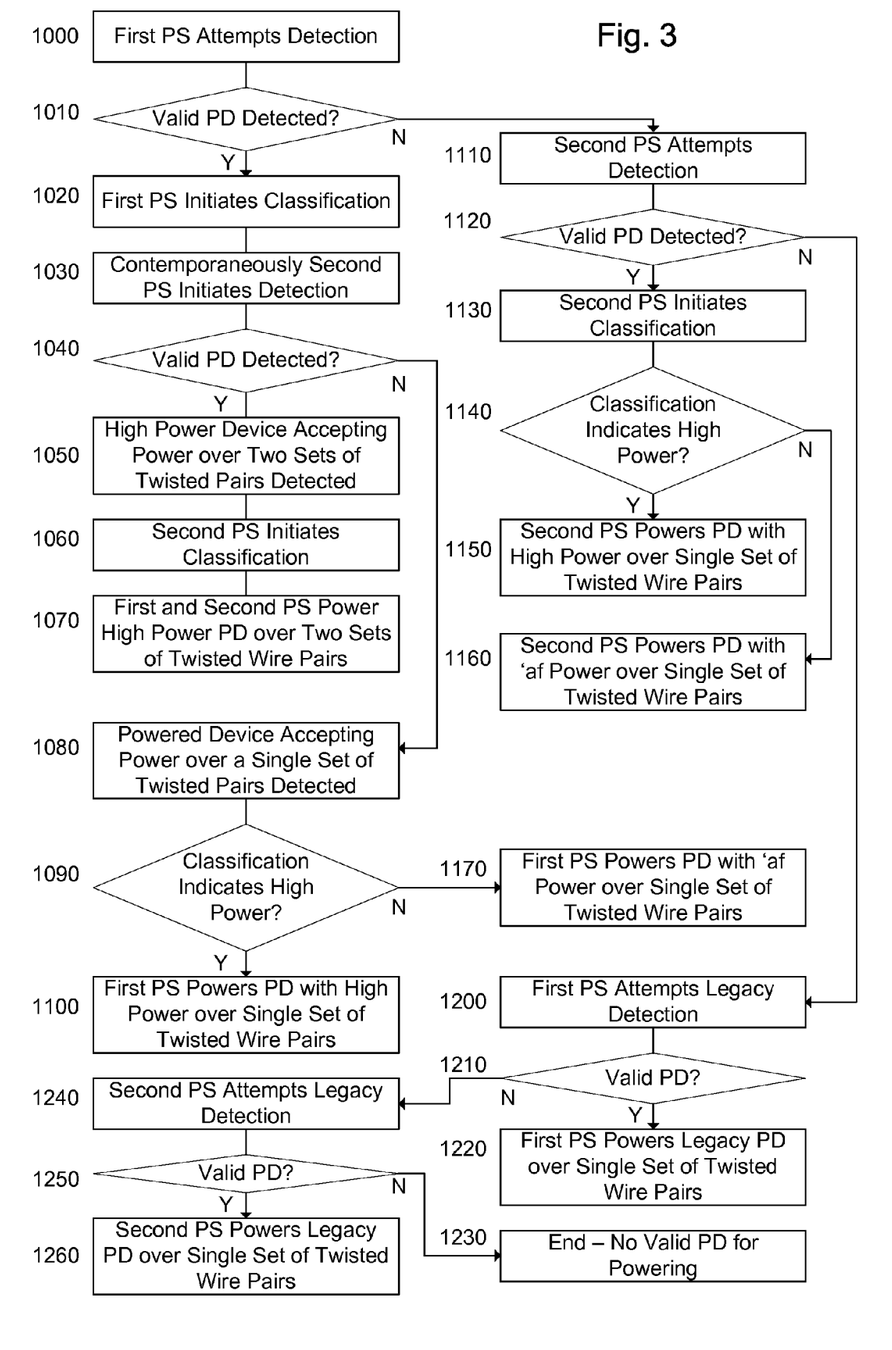
FIG. 3 illustrates a high level flow chart of the operation of the first and second PS of any of FIGS. 2A-2D to detect the presence of a PD arranged according to IEEE 802.3af arranged to receive low power over a single set of twisted wire pairs; the presence of a high power PD arranged to receive power over a single set of twisted wire powers; the presence of a high power PD arranged to receive power over two set of twisted wire pairs; the absence of valid PD; and the presence of a legacy PD exhibiting a capacitance signature.

FIG. 3 illustrates a high level flow chart of the operation of the first and second PS 220 of any of FIGS. 2A-2D to detect the presence of a PD according to IEEE 802.3af arranged to receive low power over a single set of twisted wire pairs; the presence of a high power PD arranged to receive power over a single set of twisted wire powers; the presence of a high power PD arranged to receive power over two set of twisted wire pairs; the absence of valid PD; and the presence of a legacy PD exhibiting a capacitance signature. In an exemplary embodiment the method of FIG. 3 is controlled by the operation of power sourcing controller 230.

In stage 1000, first PS 220 attempts to detect an attached PD. Preferably, the detection is accomplished by outputting a plurality of voltages towards a connected PD, and detecting the resultant output voltage at PS 220. In stage 1010 the resultant voltages are reviewed to determine if a valid PD signature impedance has been detected. In the event that in stage 1010 a valid PD signature impedance has been detected, in stage 1020 first PS 220 initiates classification by outputting toward the detected PD, along the set of twisted wire pairs used for detection, a voltage greater than the voltages associated with the detection of stage 1000, and monitoring the resultant current flow.

In stage 1030, at least partially contemporaneously with the operation of stage 1020, second PS 220 attempts to detect an attached PD. Preferably, the detection is accomplished by outputting at least one voltage towards a connected PD, along the set of twisted wire pairs not used in stages 1000, 2020 and detecting the resultant output voltage at PS 220 in a manner described in above reference U.S. patent application Ser. No. 10/861,405 filed Jun. 7, 2004. In stage 1040 the resultant voltage or voltages are reviewed to determine if a valid PD signature impedance has been detected by the operation of stage 1030. It is to be understood that the classification voltage of stage 1020 is greater than the voltages associated with the detection of stage 1030, and thus in the event first and second PS 220 are connected via a diode bridge to a single PD interface arranged to accept power over a single set of two twisted wire pairs, such as PD interface 80 or high powered PD interface 470, detection by second PS 220 will fail as a result of the higher voltage classification of first PS 220.

In the event that in stage 1040 a valid PD signature impedance has been detected, in stage 1050 a high power powered device arranged to accept power simultaneously over two sets of twisted wire pairs, as described in relation to architectures 200 of FIGS. 2A and 300 of FIG. 2B, is flagged as detected. In stage 1060, second PS 220 initiates classification of the attached detected PD. In stage 1070, first and second PS 220 power the attached PD, after determining the appropriate classification resulting from the classification received by first PS 220 in stage 1020 and second PS 220 in stage 1060. In an exemplary embodiment the classifications represent a coded pair, which together indicate as single power requirement classification.

In the event that in stage 1040 a valid PD signature impedance has not been detected, in stage 1080 a powered device accepting power over a single set of twisted wire pairs, as described in relation to architectures 400 of FIGS. 2C and 450 of FIG. 2D, is flagged as detected. In stage 1090 the classification of stage 1020 is checked. In the event that the classification of stage 1020 is indicative of a high power powered device accepting power over a single set of two twisted wire pairs, as described above in relation to architecture 450 of FIG. 2D, in stage 1100 first PS 220 powers powered end station 240 with high power, i.e. power which may significantly exceed 12.95 watts at the PD, over a single set of twisted wire pairs. In the event that in stage 1090 the classification of stage 1020 is indicative of an 'af powered device accepting power over a single set of two twisted wire pairs, as described above in relation to architecture 400 of FIG. 2C, in stage 1170 first PS 220 powers powered end station 70 over a single set of twisted wire pairs.

In the event that in stage 1010 a valid PD signature impedance has not been detected, in stage 1110 second PS 220 attempts to detect an attached PD. Preferably, the detection is accomplished by outputting a plurality of voltages towards a connected PD, and detecting the resultant output voltage at second PS 220. In stage 1120 the resultant voltages are reviewed to determine if a valid PD signature impedance has been detected. In the event that in stage 1120 a valid PD signature impedance has been detected, second PS 220 initiates classification by outputting toward the detected PD a voltage greater than the voltages associated with the detection of stage 1110, and monitoring the resultant current flow. In stage 1140 the classification of stage 1130 is checked. In the event that the classification of stage 1130 is indicative of a high power powered device accepting power over a single set of two twisted wire pairs, as described above in relation to architecture 450 of FIG. 2D, in stage 1150 second PS 220 powers powered end station 240 with high power, i.e. power which may significantly exceed 12.95 watts at the PD, over a single set of twisted wire pairs. In the event that in stage 1140 the classification of stage 1020 is indicative of an 'af powered device accepting power over a single set of two twisted wire pairs, as described above in relation to architecture 400 of FIG. 2C, in stage 1160 second PS 220 powers powered end station 70 over a single set of twisted wire pairs.

In the event that in stage 1120 a valid PD signature impedance has not been detected, thus neither first nor second PS 220 have detected a valid signature impedance, in optional stage 1200 first PS 220 attempts a legacy detection using other methods known to those skilled in the art, including detection of a signature capacitance. In stage 1210 the legacy detection of stage 1200 is checked to see if a valid legacy detection has been detected. In the event that in stage 1210 a valid legacy detection has been detected, in stage 1220 first PS 220 powers the detected legacy PD over a single set of two twisted wire pairs.

In the event that in stage 1210 a valid legacy detection has not been detected by first PS 220, in stage 1240 second PS 220 attempts a legacy detection using other methods known to those skilled in the art, including detection of a signature capacitance. In stage 1250 the legacy detection of stage 1240 is checked to see if a valid legacy detection has been detected. In the event that in stage 1250 a valid legacy detection has been detected, in stage 1260 second PS 220 powers the detected legacy PD over a single set of two twisted wire pairs. In the event that in stage 1250 a valid legacy detection has not been detected, in stage 1230 the routine returns with no valid PD being detected.

It is to be understood that stages 1200-1260 are optional, and are only implemented if legacy detection is to be supported.

Thus the present embodiments enable a method of detection in which a first of two PSs associated with a single PD initiates a detection phase, and in the event a valid PD is detected during the detection phase the first PS begins a classification phase. The classification phase comprises the PS outputting a voltage towards the PD greater than any voltages of the detection phase. A second of two PSs associated with the same PD initiates a detection phase contemporaneously with the classification phase of the first PS. Thus, in the event an 'af PD or a high power PD arranged to receive power over one set of two twisted wire pairs is connected to the two PSs, the detection phase of the second PS will return an invalid PD as a result of the contemporaneous classification voltage of the first PS.

In the event a high powered PD arranged to receive power over two sets of two twisted wire pairs is connected to the two PSs, both PSs will detect a valid PD during the detection phase. Classification of the PDs is accomplished in one of a variety of methods, including methods described in pending U.S. patent application Ser. No. 11/053,872 filed Feb. 10, 2005 entitled "High Power Classification for Power Over Ethernet" the entire contents of which is incorporated herein by reference. Irrespective of the method used for classification, if available, power is then supplied over two sets of twisted wire pairs.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Thus the present embodiment enable an architecture for simultaneous power feeding from multiple sources over two sets of wire pairs, with classification of power requirements, particularly high power requirements, being a value encoded in the individual classification obtained over each of the sets of wire pairs.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A local area network adapted to supply power to a plurality of types of powered devices over communication cabling, the local area network comprising:
   a powered device comprising at least one signature impedance;
   a first powering source exhibiting a power output and a return;
   a second powering source exhibiting a power output and a return, said second powering source different from said first powering source; and
   communication cabling comprising a plurality of twisted wire pairs arranged to connect said first and second powering source to said powered device, said communication cabling providing a first power path coupling said power output and said return of said first powering source to said powered device, said first power path comprising a first set of twisted wire pairs of said communication cabling and a second power path coupling said power output and said return of said second powering source to said powered device, said second power path comprising a second set of twisted wire pairs of said communication cabling between said second powering source and said powered device, said first set being different from said second set,
   said first powering source operative to:
      apply a plurality of detection voltages to said powered device via said first path so as to attempt to detect a first one of said at least one signature impedance, and in the event said first one of said at least one signature impedance is detected, to at least partially classify the power requirements of said powered device by supplying a classification voltage to said powered device via said first path and measuring the resultant current flow, said classification voltage level being higher than each of the plurality of detection voltages;
   said second powering source operative to apply a detection voltage to said powered device via said second path so as to attempt to detect a second one of said at least one signature impedance at least partially contemporaneously with said supplied classification voltage of said first powering source.

2. A local area network according to claim 1, further comprising a power sourcing controller, said first and second powering source being responsive to said power sourcing controller.

3. A local area network according to claim 1, wherein said powered device comprises one of:
   a first type of powered device arranged to accept power over either one of said first power path and said second power path, said first type of powered device exhibiting a single signature impedance to said first and second paths; and a second type of powered device arranged to accept power over both said first power path and said second power path, said second type of powered device adapted to exhibit said second one of said at least one signature impedance to said second path while receiving said classification voltage on said first path.

4. A local area network according to claim 3, wherein in the event said powered device is of said first type, said second powering source will not detect said single signature impedance.

5. A local area network according to claim 1, wherein in the event said first powering source detects said first one of said at least one signature impedance and said second powering source detects said second one of said at least one signature impedance, said first and second powering sources are further operative to power said powered device via both said respective first and second paths.

6. A local area network according to claim 1, further comprising a power sourcing controller in communication with said first powering source and said second powering source, and wherein in the event said first powering source detects said first one of said at least one signature impedance and said second powering source detects said second one of said at least one signature impedance, said first and second powering sources are further operative responsive to said power sourcing controller to power said powered device via both said respective first and second paths.

7. A local area network according to claim 1, wherein in the event said first powering source detects said first one of said at least one signature impedance and said second powering source detects said second one of said at least one signature impedance, said second powering source is further operative to at least partially classify the power requirements of said powered device by supplying the classification voltage to said powered device via said second path and measuring the resultant current flow.

8. A local area network according to claim 7, wherein said first and second powering sources are further operative to power said powered device via said respective first and second paths responsive to said at least partial classifications.

9. A local area network according to claim 7, further comprising a power sourcing controller in communication with said first powering source and said second powering source, said power sourcing controller being operative to classify said power requirements of said powered device responsive to said measured resultant current flow of said classification voltage of said first powering source and said measured resultant current flow of said classification voltage of said second powering source.

10. A local area network according to claim 1, wherein in the event said first powering source does not detect said first one of said at least one signature impedance, said second powering source is operative to apply the plurality of detection voltages to said powered device via said second path so as to attempt to detect said at least one signature impedance.

11. A local area network according to claim 10, wherein in the event said second powering source detects said at least one signature impedance, said second powering source is further operative to power said powered device via said second path.

12. A local area network according to claim 10, further comprising a power sourcing controller in communication with each of said first powering source and said second powering source, and wherein in the event said second powering source detects said at least one signature impedance, said second powering source is further operative responsive to said power sourcing controller to:

at least partially classify the power requirements of said powered device by supplying the classification voltage to said powered device via said second path and measuring the resultant current flow; and power said powered device via said second path responsive to said at least partial classification.

13. A local area network according to claim 10, wherein in the event said second powering source detects said at least one signature impedance, said second powering source is further operative to:

at least partially classify the power requirements of said powered device by supplying the classification voltage to said powered device via said second path and measuring the resultant current flow; and power said powered device via said second path responsive to said at least partial classification.

14. A local area network according to claim 1, wherein in the event said first powering source detects said first one of said at least one signature impedance and said second powering source does not detect said second one of said at least one signature impedance, said first powering source is operative to power said powered device via said first power path responsive to said at least partial classification.

15. A method of detecting, classifying and powering a powered device, the method comprising:

providing a first powering source exhibiting a power output and a return;

providing a second powering source exhibiting a power output and a return, said provided second powering source different from said first powering source;

attempting to detect via applying a plurality of detection voltages from said provided first powering source, over a first power path, a first signature impedance of the powered device;

in the event said first signature impedance is detected by said provided first powering source, at least partially classifying the power requirements of the powered device by providing a classification voltage from said provided first powering source to the powered device via the first power path, said classification voltage being greater than any of said detection voltages; and attempting to detect via applying a detection voltage from said provided second powering source, via a second power path, a second signature impedance of the powered device at least partially contemporaneously with said at least partially classifying of said provided first powering source, said second power path different from said first power path but comprised within a single communication cabling therewith, said provided classification voltage preventing said detection of the second signature impedance in the event the powered device to which said provided first powering source and said provided second powering source are connected is arranged to accept power from either one, but not both, of said first and second powering source.

16. A method according to claim 15, further comprising in the event said provided first powering source detects said first signature impedance and said provided second powering source detects said second signature impedance at least partially contemporaneously with said at least partially classifying of said provided first powering source:

powering the powered device via both said provided first and second powering source.

17. A method according to claim 15, further comprising in the event said provided first powering source detects said first signature impedance and said provided second powering source detects said second signature impedance:
- at least partially classifying the power requirements of the powered device by providing the classification voltage from said provided second powering source; and
- powering the powered device via both said provided first powering source and said provided second powering source responsive to said at least partial classifications.

18. A method according to claim 15, further comprising in the event said provided first powering source does not detect the first signature impedance:
- attempting to detect via applying a plurality of detection voltages from said provided second powering source the second signature impedance of the connected powered device.

19. A method according to claim 18, further comprising in the event said provided second powering source detects said second signature impedance:
- powering the powered device via said provided second powering source.

20. A method according to claim 18, further comprising in the event said provided second powering source detects said second signature impedance:
- at least partially classifying, by providing the classification voltage from said provided second powering source, the power requirements of the powered device; and
- powering the powered device from said provided second powering source responsive to said at least partial classification.

21. A method according to claim 15, further comprising in the event said provided first powering source detects said first signature impedance and said provided second powering source does not detect said second signature impedance:
- powering the powered device from said provided first powering source responsive to said at least partial classification.

22. A method according to claim 15, wherein said provided classification voltage not preventing said detection of the second signature impedance in the event the powered device to which said provided first powering source and said provided second powering source are connected is arranged to accept power from both of said first and second powering sources.

23. A powering source unit adapted to supply power to a plurality of types of powered devices over communication cabling, the powering source unit comprising:
- a first powering source; and
- a second powering source different from said first powering source;
- said first powering source operative to:
  - apply a plurality of detection voltages towards a powered device via a first path so as to attempt to detect a first signature impedance, and in the event said first signature impedance is detected, to
  - at least partially classify the power requirements of the powered device by supplying a classification voltage towards said powered device via the first path and measuring the resultant current flow, said classification voltage level being higher than each of the plurality of detection voltage levels;
- said second powering source operative to apply a detection voltage towards the powered device via a second path, said second path different from said first path, so as to attempt to detect a second signature impedance at least partially contemporaneously with said supplied classification voltage of said first powering source.

24. A powering source unit according to claim 23, wherein in the event said first powering source detects the first signature impedance and said second powering source detects the second signature impedance, said first and second powering sources are further operative to supply power towards the powered device.

25. A powering source unit according to claim 23, further comprising a power sourcing controller in communication with each of said first powering source and said second powering source, said attempting to detect and said classifying being responsive to said power sourcing controller.

* * * * *